United States Patent
Imazato et al.

(10) Patent No.: US 11,441,030 B2
(45) Date of Patent: *Sep. 13, 2022

(54) RESIN COMPOSITION AND FILM FORMED FROM SAME

(71) Applicant: TEIJIN LIMITED, Osaka (JP)

(72) Inventors: Kenta Imazato, Osaka (JP); Shoichi Maekawa, Osaka (JP); Katsuhiro Yamanaka, Osaka (JP)

(73) Assignee: TEIJIN LIMITED, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/763,282

(22) PCT Filed: Sep. 21, 2016

(86) PCT No.: PCT/JP2016/077769
§ 371 (c)(1),
(2) Date: Mar. 26, 2018

(87) PCT Pub. No.: WO2017/057117
PCT Pub. Date: Apr. 6, 2017

(65) Prior Publication Data
US 2018/0282540 A1    Oct. 4, 2018

(30) Foreign Application Priority Data
Oct. 2, 2015  (JP) .............. JP2015-196804

(51) Int. Cl.
| C08L 69/00 | (2006.01) |
| C08G 64/02 | (2006.01) |
| C08G 64/30 | (2006.01) |
| C08J 5/18 | (2006.01) |
| C08L 33/06 | (2006.01) |
| C08L 33/12 | (2006.01) |

(52) U.S. Cl.
CPC .............. *C08L 69/00* (2013.01); *C08G 64/02* (2013.01); *C08G 64/0208* (2013.01); *C08G 64/305* (2013.01); *C08J 5/18* (2013.01); *C08L 33/06* (2013.01); *C08L 33/12* (2013.01); *C08J 2333/12* (2013.01); *C08J 2369/00* (2013.01); *C08J 2433/12* (2013.01); *C08J 2469/00* (2013.01); *C08L 2203/16* (2013.01)

(58) Field of Classification Search
None
See application file for complete search history.

(56) References Cited

U.S. PATENT DOCUMENTS

| 4,319,003 | A | 3/1982 | Gardlund | |
| 2010/0179286 | A1* | 7/2010 | Oda | ........................ C08L 23/02 |
| | | | | 525/186 |
| 2016/0303766 | A1* | 10/2016 | Kobayashi | .............. C08L 69/00 |

FOREIGN PATENT DOCUMENTS

| EP | 2 894 198 | 7/2015 |
| JP | 7-3104 | 1/1995 |
| JP | 2006-36954 | 2/2006 |

(Continued)

OTHER PUBLICATIONS

Matweb, "Mitsubishi Rayon Acrypet MD 001 PMMA Resin," (http://www.matweb.com/search/DataSheet.aspx?MatGUID=321 fbeb1b7f94bc89dffe221007c97da&ckck=1, last accessed Jun. 24, 2019). (Year: 2019).*

(Continued)

*Primary Examiner* — Randy P Gulakowski
*Assistant Examiner* — Ha S Nguyen
(74) *Attorney, Agent, or Firm* — Wenderoth, Lind & Ponack, L.L.P.

(57) ABSTRACT

Provided is a resin composition comprising:

a polycarbonate resin (A) containing, as main repeating units, a unit (a-1) represented by the following formula (a-1)

[Chem. 1]

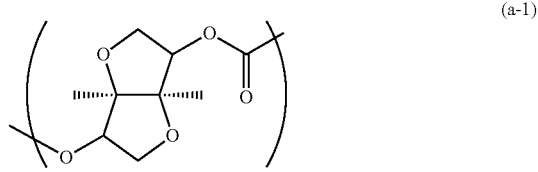

(a-1)

and a unit (a-2) represented by the following formula (a-2)

[Chem. 2]

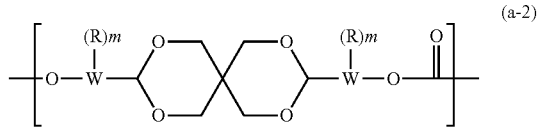

(a-2)

(wherein, W represents a $C_{1-20}$ alkylene group or a $C_{6-20}$ cycloalkylene group, R represents a branched or linear-chain $C_{1-20}$ alkyl group or a $C_{6-20}$ cycloalkyl group optionally substituted, and m represents an integer of 0 to 10) and an acrylic resin (B), and the polycarbonate resin and the acrylic resin are in a weight ratio of 40:60 to 99:1, wherein the resin composition has a single glass transition temperature, which is in the range of 90° C. to 150° C., and the resin composition has excellent transparency, chemical resistance, surface hardness and heat resistance, and has a low photoelastic coefficient.

7 Claims, No Drawings

(56) References Cited

FOREIGN PATENT DOCUMENTS

| | | | | |
|---|---|---|---|---|
| JP | 2009-46519 | | 3/2009 | |
| JP | 2009-102536 | | 5/2009 | |
| JP | 2010-77398 | | 4/2010 | |
| JP | 2010077398 A | * | 4/2010 | |
| JP | 2012201832 A | * | 10/2012 | |
| JP | 2014-1267 | | 1/2014 | |
| JP | 2015-160941 | | 9/2015 | |
| JP | 2015-160942 | | 9/2015 | |
| JP | 2015-232091 | | 12/2015 | |
| JP | 2016-7728 | | 1/2016 | |
| JP | 2016079386 A | * | 5/2016 | |
| JP | 2016-150990 | | 8/2016 | |
| WO | 2008/020636 | | 2/2008 | |
| WO | WO-2015098428 A1 | * | 7/2015 | ............. B29B 7/487 |
| WO | 2015/119026 | | 8/2015 | |

OTHER PUBLICATIONS

Supplementary European Search Report dated Aug. 22, 2018 in corresponding European Patent Application No. 16851291.1.
International Search Report dated Nov. 29, 2016 in International (PCT) Application No. PCT/JP2016/077769.
Chinese Office Action dated Jul. 24, 2019 in corresponding Chinese Application No. 201680057298.7, with English translation.
Notice of Reasons for Refusal dated Jun. 18, 2019 in corresponding Japanese Patent Application No. 2017-543176, with English Translation.

* cited by examiner

RESIN COMPOSITION AND FILM FORMED FROM SAME

TECHNICAL FIELD

The present invention relates to a resin composition having excellent transparency, chemical resistance, surface hardness and heat resistance, and having a low photoelastic coefficient and to a film formed from the composition.

BACKGROUND ART

As transparent resins, methacrylic resin, polycarbonate resin (may be referred to as PC hereinafter) and the like have been conventionally known. Such resins are used in a wide variety of fields such as electric and electronic parts, optical parts, auto parts and mechanical parts in the form of a molded article, a film or the like.

Methacrylate resins such as polymethyl methacrylate (may be referred to as PMMA hereinafter) have high transparency and high surface hardness (pencil hardness H to 3H) and are frequently used as optical materials such as lenses and optical fibers. The resins, however, have low resistance to daily-use chemicals such as sunscreen, and thus, use of such resins in applications involving direct touching by a human hand is limited, which has been a problem.

In recent years, due to problems such as concern about the depletion of oil resources and an increase in the amount of carbon dioxide in the air which causes global warming, biomass resources are attracting a lot of attention which do not depend on oil as a raw material and effect carbon neutral that they do not increase the amount of carbon dioxide even when they are burnt. In the field of polymers, the development of biomass plastics produced from the biomass resources is now actively under way. In particular, polycarbonates using isosorbide as the main monomer have excellent heat resistance, weather resistance and chemical resistance, and the characteristics thereof are different from those of ordinary polycarbonates made from bisphenol A. For this reason, such polycarbonates are attracting attention, and various studies have been made (PTLs 1 and 2). These isosorbide-based polycarbonates have excellent heat resistance, impact resistance and weather resistance, whereas the polycarbonates have problems of having a higher photoelastic coefficient and slightly poorer surface hardness compared with acrylic resins.

A mixture of PC and PMMA is known to be essentially immiscible and to form an opaque material. For example, PTL 3 mentions that a mixture of PC and PMMA is opaque and physical properties possessed by each of the polymers do not develop. Meanwhile, PTL 4 mentions that blended compositions of a polycarbonate resin containing fluorinated monomers and an acrylic resin would be transparent, but these compositions contain an aromatic moiety in the polycarbonate resin, and thus, have an issue concerning weather resistance and optical properties such as a photoelastic coefficient. In PTL 5, a transparent resin composition has been obtained by modification of an acrylic resin. However, this composition also has an issue concerning weather resistance and optical properties such as a photoelastic coefficient because the acrylic resin contains an aromatic moiety. Isosorbide-based polycarbonates, which also have low miscibility with PMMA, do not provide practically satisfactory transparency when formed into a film. Accordingly, no resin composition and film have been provided yet which is made of isosorbide-based polycarbonate having excellent transparency, chemical resistance and surface hardness, and having a low photoelastic coefficient.

CITATION LIST

Patent Literature

[PTL 1] Japanese Unexamined Patent Application Publication No. 2006-36954
[PTL 2] Japanese Unexamined Patent Application Publication No. 2009-46519
[PTL 3] U.S. Pat. No. 4,319,003
[PTL 4] Japanese Unexamined Patent Application Publication No. H07-3104
[PTL 5] Japanese Unexamined Patent Application Publication No. 2014-1267

SUMMARY OF INVENTION

Technical Problem

It is an object of the present invention to provide a resin composition having excellent transparency, chemical resistance, surface hardness and heat resistance, and having a low photoelastic coefficient and a film formed from the composition.

Solution to Problem

The present inventors have extensively studied and, as a result, have found that by mixing a polycarbonate resin containing a certain ratio of isosorbide and a monomer having a specific spirocyclic structure as a comonomer and an acrylic resin, a resin composition having excellent transparency, chemical resistance, surface hardness and heat resistance, and having a low photoelastic coefficient and a film foil led from the composition are produced, thereby having completed the present invention.

That is, according to the present invention, the object of the invention can be achieved by the following.

1. A resin composition comprising:
a polycarbonate resin (A) containing, as main repeating units, a unit (a-1) represented by the following formula (a-1)

[Chem. 1]

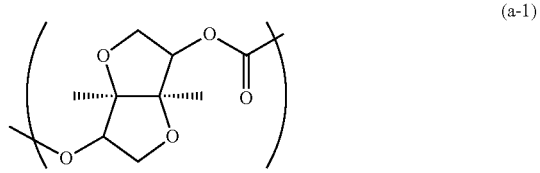

(a-1)

and a unit (a-2) represented by the following formula (a-2)

[Chem. 2]

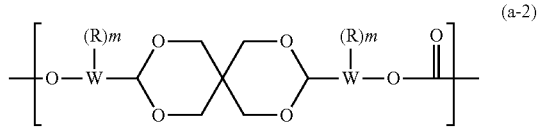

(a-2)

(wherein, W represents a $C_{1-20}$ alkylene group or a $C_{6-20}$ cycloalkylene group, R represents a branched or linear-chain $C_{1-20}$ alkyl group or a $C_{6-20}$ cycloalkyl group optionally substituted, and m represents an integer of 0 to 10) and an acrylic resin (B), and the polycarbonate resin and the acrylic resin are in a weight ratio of 40:60 to 99:1, wherein the resin composition has a single glass transition temperature, and the glass transition temperature is in the range of 90° C. to 150° C.

2. The resin composition according to item 1 above, wherein the polycarbonate resin (A) has a molar ratio (a-1/a-2) of the unit (a-1) to the unit (a-2) of 40/60 to 95/5.

3. The resin composition according to item 1 above, wherein the composition has a surface hardness of F or higher.

4. The composition according to item 1 above, wherein the composition has a photoelastic coefficient of $25 \times 10^{-12}$ $Pa^{-1}$ or less.

5. The resin composition according to item 1 above, wherein the polycarbonate resin (A) has a specific viscosity ($\eta_{SP}$) in the range of 0.2 to 1.5.

6. The resin composition according to item 1 above, wherein the acrylic resin is a thermoplastic acrylic resin which complies with JIS K7210 and has a melt flow rate, measured at 230° C. and a load of 3.8 kg, of 0.5 to 30 g/10 min.

7. The resin composition according to item 1 above, wherein the acrylic resin is an acrylic resin derived from methyl methacrylate and/or methyl acrylate.

8. The resin composition according to item 1 above, wherein the unit (a-2) of the polycarbonate resin (A) is a unit derived from 3,9-bis(2-hydroxy-1,1-dimethylethyl)-2,4,8,10-tetraoxaspiro[5.5]undecane.

9. A film formed from the resin composition according to any one of items 1 to 8 above.

Advantageous Effect of Invention

The present invention has made it possible to provide a resin composition having excellent transparency, chemical resistance, surface hardness and heat resistance, and having a low photoelastic coefficient and a film formed from the composition by employing a polycarbonate resin containing a certain ratio of isosorbide and a monomer having a specific spirocyclic structure as a comonomer and an acrylic resin. Accordingly, the resulting industrial effect is extraordinary.

DESCRIPTION OF EMBODIMENT

The invention will be described in detail hereinafter.
<Polycarbonate Resin>
(Polycarbonate Resin (A))

The main repeating unit of the polycarbonate resin (A) of the present invention is composed of a unit (a-1) and a unit (a-2). "Main repeating unit" means that the total of the unit (a-1) and the unit (a-2) is 50 mol % or more based on the total amount of repeating units, preferably 60 mol % or more, more preferably 70 mol % or more, still more preferably 80 mol % or more, and most preferably 90 mol % or more.

(Unit (a-1))

The unit (a-1) in the present invention is, as shown in the above formula (a-1), derived from an aliphatic diol having an ether group.

Of biomass resources represented by the above formula (a-1), a polycarbonate resin containing a diol having an ether bond is a material having high heat resistance and pencil hardness.

Examples of the formula (a-1) include repeating units (a-1-1), (a-1-2) and (a-1-3) represented by the following formulas, which are in stereoisomeric relations.

[Chem. 3]

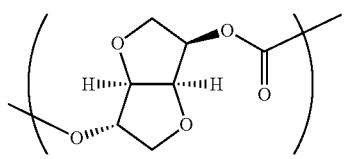

(a-1-1)

[Chem. 4]

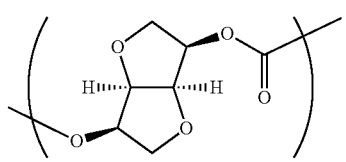

(a-1-2)

[Chem. 5]

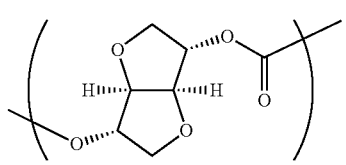

(a-1-3)

These are ether diols derived from carbohydrates, which are substances obtainable also from biomass in nature and one of substances called renewable resources. The repeating units (a-1-1), (a-1-2) and (a-1-3) are units derived from an aliphatic diol called isosorbide, isomannide and isoidide, respectively. Isosorbide is obtained by hydrogenating D-glucose obtained from starch, followed by dehydration. Other ether diols can also be obtained from the same reaction, except for the starting materials.

Among isosorbide, isomannide and isoidide, a repeating unit derived from isosorbide (1,4;3,6-dianhydro-D-sorbitol) is easy to produce and has excellent heat resistance, and thus is particularly preferable.

(Unit (a-2))

The unit (a-2) in the present invention is, as shown in the above formula (a-2), derived from a diol having a spirocyclic structure.

In the formula (a-2), W represents a $C_{1-20}$ alkylene group or a $C_{6-20}$ cycloalkylene group, is preferably a $C_{1-10}$ alkylene group, more preferably a $C_{1-6}$ alkylene group, and still more preferably a $C_{1-4}$ alkylene group.

In the formula (a-2), R represents a branched or linear-chain $C_{1-20}$ alkyl group or a $C_{6-20}$ cycloalkyl group optionally substituted, is preferably a branched or linear-chain $C_{1-10}$ alkyl group, preferably a branched or linear-chain $C_{1-6}$ alkyl group, and more preferably a branched or linear-chain $C_{1-4}$ alkyl group.

In the formula (a-2), m represents an integer of 0 to 10, m is preferably an integer of 0 to 6, and m is more preferably an integer of 0 to 4.

Specific examples of the diol compound having a spirocyclic structure include alicyclic diol compounds such as 3,9-bis(2-hydroxyethyl)-2,4,8,10-tetraoxaspiro[5.5]undecane, 3,9-bis(2-hydroxy-1,1-dimethylethyl)-2,4,8,10-tetraoxaspiro[5.5]undecane, 3,9-bis(2-hydroxy-1,1-diethylethyl)-2,4,8,10-tetraoxaspiro[5.5]undecane and 3,9-bis(2-hydroxy-1,1-dipropylethyl)-2,4,8,10-tetraoxaspiro[5.5]undecane.

Preferably, 3,9-bis(2-hydroxy-1,1-dimethylethyl)-2,4,8,10-tetraoxaspiro[5.5]undecane is used.

(Other Units)

Diol compounds that derive other units other than the unit (a-1) and the unit (a-2) may be any of other aliphatic diol compounds, alicyclic diol compounds and aromatic dihydroxy compounds. Examples thereof include diol compounds described in WO 2004/111106 and WO 2011/021720 and oxyalkylene glycols such as diethylene glycol, triethylene glycol, tetraethylene glycol and polyethylene glycol.

Examples of the aliphatic diol compound include 1,3-propanediol, 1,4-butanediol, 1,5-pentanediol, 1,6-hexanediol, 1,8-octanediol, 1,9-nonanediol, 1,10-decanediol, 1,12-dodecanediol, 2-methyl-1,3-propanediol, neopentyl glycol, 3-methyl-1,5-pentanediol, 2-n-butyl-2-ethyl-1,3-propanediol, 2,2-diethyl-1,3-propanediol, 2,4-diethyl-1,5-pentanediol, 1,2-hexaneglycol, 1,2-octylglycol, 2-ethyl-1,3-hexanediol, 2,3-diisobutyl-1,3-propanediol, 2,2-diisoamyl-1,3-propanediol and 2-methyl-2-propyl-1,3-propanediol.

Examples of the alicyclic diol compound include cyclohexane dimethanol, tricyclodecane dimethanol, adamantanediol, pentacyclopentadecane dimethanol and 2,2,4,4-tetramethyl-1,3-cyclobutanediol.

Examples of the aromatic dihydroxy compound include α,α'-bis(4-hydroxyphenyl)-m-diisopropylbenzene (bisphenol M), 9,9-bis(4-hydroxy-3-methylphenyl)fluorene, 1,1-bis(4-hydroxyphenyl)cyclohexane, 1,1-bis(4-hydroxyphenyl)-3,3,5-trimethylcyclohexane, 4,4'-dihydroxy-3,3'-dimethyldiphenylsulfide, bisphenol A, 2,2-bis(4-hydroxy-3-methylphenyl)propane (bisphenol C), 2,2-bis(4-hydroxyphenyl)-1,1,1,3,3,3-hexafluoropropane (bisphenol AF) and 1,1-bis(4-hydroxyphenyl)decane.

(Composition)

The main repeating units of the polycarbonate resin (A) used in the present invention include a unit (a-1) and a unit (a-2), and their molar ratio (a-1/a-2) is preferably 40/60 to 95/5. The molar ratio (a-1/a-2) is preferably 40/60 to 95/5 because chemical resistance and surface hardness become high, and additionally, the miscibility with acrylic resin is obtained. The molar ratio (a-1/a-2) of the unit (a-1) to the unit (a-2), is preferably 45/55 to 90/10, more preferably 50/50 to 85/15, and still more preferably 60/40 to 80/20. When the composition is within this range, the balance between the miscibility with the acrylic resin and the chemical resistance is particularly excellent. When the molar ratio (a-1/a-2) is less than 40/60, the chemical resistance is insufficient. Meanwhile, when the molar ratio (a-1/a-2) is more than 95/5, the miscibility with the acrylic resin may deteriorate. The molar ratio (a-1/a-2) can be calculated by measuring using a JNM-AL400 proton NMR manufactured by JEOL LTD.

(Method for Producing Polycarbonate Resin (A))

The polycarbonate resin (A) is produced by a reaction means for producing an ordinary polycarbonate resin, which itself is a known method, such as by allowing a carbonate precursor such as a carbonic acid diester to react with a diol component. Next, basic techniques for such production methods will be briefly described.

A transesterification reaction using a carbonic acid diester as a carbonate precursor is carried out by a method in which a predetermined proportion of a diol component is stirred with a carbonic acid diester with heating in an inert gas atmosphere, and the alcohol or phenol produced is distilled off. The reaction temperature, which depends on the boiling point of the alcohol or phenol produced, is generally 120 to 300° C. The reaction is carried out at reduced pressure from the initial stage and is completed while distilling the alcohol or phenol produced off. An end terminator, an antioxidant and the like may also be added as required.

Examples of the carbonic acid diester used for the transesterification reaction include esters of optionally substituted $C_{6-12}$ aryl group and aralkyl group. Specific examples thereof include diphenyl carbonate, ditolyl carbonate, bis(chlorophenyl)carbonate and m-cresyl carbonate. Among them, diphenyl carbonate is particularly preferable. The amount of diphenyl carbonate used is preferably 0.97 to 1.10 moles based on 1 mole of the total of dihydroxy compounds, and more preferably 1.00 to 1.06 moles.

In addition, in a melt-polymerization method, a polymerization catalyst may be used to increase the polymerization rate. Examples of such a polymerization catalyst include alkali metal compounds, alkaline earth metal compounds, nitrogen-containing compounds and metal compounds. As such compounds, for example, organic acid salts, inorganic salts, oxides, hydroxides, hydrides, alkoxides and quaternary ammonium hydroxides of alkali metals and alkaline earth metals, are preferably used. These compounds may be used singly or in combination.

Examples of the alkali metal compound include sodium hydroxide, potassium hydroxide, cesium hydroxide, lithium hydroxide, sodium hydrogen carbonate, sodium carbonate, potassium carbonate, cesium carbonate, lithium carbonate, sodium acetate, potassium acetate, cesium acetate, lithium acetate, sodium stearate, potassium stearate, cesium stearate, lithium stearate, sodium borohydride, sodium benzoate, potassium benzoate, cesium benzoate, lithium benzoate, di sodium hydrogen phosphate, dipotassium hydrogen phosphate, dilithium hydrogen phosphate, disodium phenyl phosphate, disodium salt, dipotassium salt, dicesium salt and dilithium salt of bisphenol A, and sodium salt, potassium salt, cesium salt and lithium salt of phenol.

Examples of the alkaline earth metal compound include magnesium hydroxide, calcium hydroxide, strontium hydroxide, barium hydroxide, magnesium carbonate, calcium carbonate, strontium carbonate, barium carbonate, magnesium diacetate, calcium diacetate, strontium diacetate, barium diacetate and barium stearate.

Examples of the nitrogen-containing compound include quaternary ammonium hydroxides having an alkyl, aryl group, or the like, such as tetramethylammonium hydroxide, tetraethylammonium hydroxide, tetrapropylammonium hydroxide, tetrabutylammonium hydroxide and trimethylbenzylammonium hydroxide. Examples also include tertiary amines, such as triethylamine, dimethylbenzylamine and triphenylamine, and imidazoles, such as 2-methylimidazole, 2-phenylimidazole and benzimidazole. Examples also include bases and basic salts such as ammonia, tetramethylammonium borohydride, tetrabutylammonium borohydride, tetrabutylammonium tetraphenylborate and tetraphenylammonium tetraphenylborate.

Examples of the metal compound include zinc aluminum compounds, germanium compounds, organotin compounds, antimony compounds, manganese compounds, titanium compounds and zirconium compounds. These compounds may be used singly or two or more of these may be used in combination. The amount of the polymerization catalyst used is selected from the range of preferably $1 \times 10^{-9}$ to $1 \times 10^{-2}$ equivalents, preferably $1 \times 10^{-8}$ to $1 \times 10^{-5}$ equivalents, and more preferably $1 \times 10^{-7}$ to $1 \times 10^{-3}$ equivalents based on 1 mole of the diol component.

In addition, it is also possible to add a catalyst deactivator in the late stage of the reaction. As catalyst deactivators to be used, known catalyst deactivators are effectively used.

Among them, an ammonium salt or phosphonium salt of sulfonic acid is preferred. Further, salts of dodecylbenzenesulfonic acid, such as tetrabutylphosphonium dodecylbenzenesulfonate, and salts of p-toluenesulfonic acid, such as tetrabutylammonium p-toluenesulfonate, are preferred.

In addition, as esters of sulfonic acid, methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate, phenyl p-toluenesulfonate and the like are preferably used. Among them, tetrabutylphosphonium dodecylbenzenesulfonate is most preferably used.

When at least one polymerization catalyst selected from alkali metal compounds and/or alkaline earth metal compounds is used, the amount of these catalyst deactivators is used preferably in a ratio of 0.5 to 50 moles based on 1 mole of the catalyst, more preferably 0.5 to 10 moles, and still more preferably 0.8 to 5 moles.

(Specific viscosity: $\eta_{SP}$)

The specific viscosity ($\eta_{SP}$) of the polycarbonate resin (A) is preferably within the range of 0.2 to 1.5. When the specific viscosity is within a range of 0.2 to 1.5, molded articles such as films will have excellent strength and moldability. The specific viscosity is more preferably 0.25 to 1.2, still more preferably 0.3 to 1.0, in particular preferably 0.3 to 0.7, and most preferably 0.3 to 0.5.

The specific viscosity referred to in the present invention is determined from a solution prepared by dissolving 0.7 g of the polycarbonate resin in 100 ml of methylene chloride at 20° C. by using an Ostwald viscometer.

Specific viscosity($\eta_{SP}$)=$(t-t_0)/t_0$

[$t_0$ is the flow down time in seconds for methylene chloride, and t is the flow down time in seconds for a sample solution]

Incidentally, the concrete measurement of the specific viscosity can be carried out, for example, as follows. The polycarbonate resin is first dissolved in methylene chloride in an amount of 20 to 30 times the weight of the resin, and a soluble component is collected by Celite filtration. Then, the solvent is removed and the residue is dried completely so as to obtain the solid soluble in methylene chloride. The specific viscosity at 20° C. of a solution prepared by dissolving 0.7 g of the solid in 100 ml of methylene chloride is determined by using an Ostwald viscometer.

(Acrylic Resin (B))

As the acrylic resin used in the present invention, an acrylic resin as a thermoplastic is used. As monomers used for the acrylic resin, the following compounds are exemplified. Examples thereof include methyl methacrylate, methyl acrylate, methacrylic acid, acrylic acid, benzyl(meth)acrylate, n-butyl(meth)acrylate, i-butyl(meth)acrylate, t-butyl (meth)acrylate, 2-ethylhexyl(meth)acrylate, lauryl(meth) acrylate, tridecyl(meth)acrylate, stearyl(meth)acrylate, glycidyl(meth)acrylate, hydroxypropyl(meth)acrylate, 2-methoxyethyl(meth)acrylate, 2-ethoxyethyl(meth)acrylate, cyclohexyl(meth)acrylate, isobornyl(meth)acrylate, norbornyl(meth)acrylate, dicyclopentenyl(meth)acrylate, dicyclopentanyl(meth)acrylate, dicyclopentenyloxyethyl (meth)acrylate, tetrahydrofurfuryl(meth)acrylate, acryl (meth)acrylate, 2-hydroxyethyl(meth)acrylate, 2-(meth) acryloyloxyethyl succinate, 2-(meth)acryloyloxyethyl maleate, 2-(meth)acryloyloxyethyl phthalate, 2-(meth)acryloyloxyethyl hexahydrophthalate, pentamethylpiperidyl (meth)acrylate, tetramethylpiperidyl(meth)acrylate, dimethylaminoethyl(meth)acrylate, diethylaminoethyl(meth) acrylate, cyclopentyl methacrylate, cyclopentyl acrylate, cyclohexyl methacrylate, cyclohexyl acrylate, cycloheptyl methacrylate, cycloheptyl acrylate, cyclooctyl methacrylate, cyclooctyl acrylate, cyclododecyl methacrylate and cyclododecyl acrylate.

These monomers may be singly polymerized and used, or two or more of these may be polymerized and used. Particularly, it is preferred to contain methyl methacrylate and/or methyl acrylate. In a monomer component, 50 to 99 mol % of methyl methacrylate and 1 to 50 mol % of methyl acrylate are preferably contained, 60 to 99 mol % of methyl methacrylate and 1 to 40 mol % of methyl acrylate are more preferably contained, and 70 to 99 mol % of methyl methacrylate and 1 to 30 mol % of methyl acrylate are still more preferably contained. When the amount of methyl methacrylate is more than 99 mol % in a monomer component, thermal decomposition resistance is insufficient, and molding failure such as silver streak may occur during molding. When the amount of methyl methacrylate is less than 50 mol % in a monomer component, the thermal deformation temperature may decrease. Other monomers that may be polymerized with these acrylic monomers, such as olefinic monomers and vinylic monomers may be used in combination in an amount of 0 to 30% by weight.

The molecular weight of the acrylic resin is not particularly limited. When its weight average molecular weight is in the range of 30,000 or more and 300,000 or less, it is possible to provide a film having excellent mechanical properties and heat resistance without causing improper appearance such as flow unevenness during molding to film.

The glass transition temperature (Tg) of the acrylic resin used in the present invention is preferably 90 to 150° C., more preferably 95 to 145° C., and still more preferably 100 to 140° C. When Tg is 90 to 150° C., heat-resistance stability and moldability are satisfactory, which is preferably. The glass transition temperature (Tg) is measured by using a 2910 DSC manufactured by TA Instrument Japan Co., Ltd. at a temperature rise rate of 20° C./min.

The acrylic resin of the present invention, though not particularly limited, is preferably an acrylic resin complying with JIS K7210 and having a melt flow rate, measured at 230° C. and a load of 3.8 kg, of 0.5 to 30 g/10 min. An acrylic resin more preferably has a melt flow rate of 0.7 to 27 g/10 min, still more preferably 1.0 to 25 g/10 min is, and in particular preferably 1.5 to 20 g/10 min. An acrylic resin having a melt flow rate within the range has satisfactory moldability. To the acrylic resin, various common additives, such as a heat stabilizer, an ultraviolet absorber, a light-resistant stabilizer, a colorant, a release agent, a slip agent, an antistatic agent and a matting agent may be added.

(Method for Producing Resin Composition Containing Polycarbonate Resin and Acrylic Resin)

For the resin composition of the present invention, the polycarbonate resin is preferably blended with the acrylic resin in a molten state. As a method of blending in a molten state, an extruder is generally used. The resins are kneaded and pelletized preferably at a molten resin temperature of 200 to 320° C., more preferably 220 to 300° C., and still more preferably 230 to 290° C. This can provide pellets of a resin composition in which both the resins are homogeneously blended. The configuration of the extruder and the configuration of the screw(s) are not particularly limited. When the molten resin temperature in the extruder exceeds 320° C., the resin may be colored or thermally decomposed. In contrast, when the resin temperature falls below 200° C., the resin viscosity is extremely high and the extruder may become overloaded.

(Weight Ratio)

The polycarbonate resin and the acrylic resin described above can be optionally mixed in the weight ratio range of 40:60 to 99:1. The weight ratio is preferably in the range of 40:60 to 98:2 (weight ratio), more preferably 50:50 to 97:3, still more preferably 50:50 to 95:5, and particularly preferably 60:40 to 95:5. When the amount of the polycarbonate component becomes less than 40% by weight, the chemical resistance becomes a problem. The weight ratio in the range described above can provide a resin composition having excellent heat resistance, chemical resistance and surface hardness.

(Glass Transition Temperature: Tg)

The resin composition of the present invention has a single glass transition temperature (Tg), and the glass transition temperature (Tg) is in the range of 90 to 150° C., preferably 100 to 140° C., more preferably 110 to 140° C., and still more preferably 110 to 130° C. When Tg is in the range described above, heat-resistance stability and moldability are satisfactory, which is preferable.

The glass transition temperature (Tg) is measured by using a 2910 DSC manufactured by TA Instrument Japan Co., Ltd. at a temperature rise rate of 20° C./min. In the present invention, that the composition has a single glass transition temperature (Tg) means that only one inflection point representing a glass transition temperature appears when the glass transition temperature is measured in compliance with JIS K 7121 at a heating rate of 20° C./min using a differential scanning calorimeter (DSC).

Generally, that a polymer blend composition has a single glass transition temperature means that the resins to be mixed are in a miscible state at the order of nanometer (molecular level). The blend composition can be regarded as a miscible system.

(Pencil Hardness)

The resin composition of the present invention preferably has a pencil hardness of F or higher. In terms of providing excellent abrasion resistance, the pencil hardness is more preferably H or higher. The resin composition with the pencil hardness of 4 H or less has a sufficient function. The pencil hardness can be increased by increasing the weight ratio of the acrylic resin. In the present invention, when the resin of the present invention is scratched with a pencil of a specific pencil hardness, the pencil hardness means a hardness at which no scratch mark is left. It is preferable to use, as an index, the pencil hardness used for painted surface hardness test, which can measure hardness in accordance with JIS K-5600. As indicated by pencil hardness, softness increases in the following order: 9H, 8H, 7H, 6H, 5H, 4H, 3H, 2H, H, F, HB, B, 2B, 3B, 4B, 5B, 6B, where the hardest is 9H, while the softest is 6B.

(Additives)

The resin composition used in the present invention may be blended, depending on the intended use or as required, with additives such as heat stabilizers, plasticizers, light stabilizers, polymerization metal deactivators, flame retardants, lubricants, antistatic agents, surfactants, antimicrobials, ultraviolet absorbers, release agents, colorants and impact modifiers.

(Heat Stabilizer)

The resin composition used in the present invention preferably contains a heat stabilizer in order to suppress the molecular weight reduction and hue deterioration at the time of extrusion/molding. Examples of the heat stabilizer include phosphorus-based heat stabilizers, phenol-based heat stabilizers and sulfur-based heat stabilizers. These can be used singly, or two or more of them can be used in combination. In particular, since an ether diol residue of the unit (a-1) is likely to be degraded by heat and oxygen and colored, a phosphorus-based heat stabilizer is preferably contained as a heat stabilizer. As the phosphorus-based stabilizer, a phosphite compound is preferably blended. Examples of the phosphite compound include pentaerythritol-type phosphite compounds, phosphite compounds which react with a dihydric phenol to have a cyclic structure, and phosphite compounds having other structure.

Specific examples of the pentaerythritol-type phosphite compound described above include distearylpentaerythritoldiphosphite, bis(2,4-di-tert-butylphenyl)pentaerythritoldiphosphite, bis(2,6-di-tert-butyl-4-methylphenyl)pentaerythritoldiphosphite, bis(2,6-di-tert-butyl-4-ethylphenyl)pentaerythritoldiphosphite, phenylbisphenol A pentaerythritoldiphosphite, bis(nonylphenyl)pentaerythritoldiphosphite and dicyclohexyl pentaerythritoldiphosphite. Among them, distearylpentaerythritoldiphosphite and bis(2,4-di-tert-butylphenyl)pentaerythritoldiphosphite are suitable.

Examples of the phosphite compound obtained by a reaction of a dihydric phenol to have a cyclic structure described above include 2,2'-methylenebis(4,6-di-tert-butylphenyl)(2,4-di-tert-butylphenyl)phosphite, 2,2'-methylenebis(4,6-di-tert-butylphenyl)(2-tert-butyl-4-methylphenyl)phosphite, 2,2'-methylenebis(4-methyl-6-tert-butylphenyl)(2-tert-butyl-4-methylphenyl)phosphite, 2,2'-ethylidenebis(4-methyl-6-tert-butylphenyl)(2-tert-butyl-4-methylphenyl)phosphite, 2,2'-methylene-bis-(4,6-di-t-butylphenyl)octylphosphite and 6-tert-butyl-4-[3-[(2,4,8,10)-tetra-tert-butyldibenzo[d,f][1,3,2]dioxaphosphepin-6-yl)oxy]propyl]-2-methylphenol.

Examples of the phosphite compound having other structures described above include triphenyl phosphite, tris(nonylphenyl)phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, 2,2-methylenebis(4,6-di-tert-butylphenyl)octyl phosphite, tris(diethylphenyl) phosphite, tris(di-iso-propylphenyl)phosphite, tris(di-n-butylphenyl)phosphite, tris(2,4-di-tert-butylphenyl) phosphite and tris(2,6-di-tert-butylphenyl)phosphite.

Other than the various phosphite compounds, for example, phosphate compounds, phosphonite compounds and phosphonate compounds can be mentioned.

Among the phosphorus-based heat stabilizers described above, trisnonylphenyl phosphite, trimethyl phosphate, tris(2,4-di-tert-butylphenyl)phosphite, bis(2,4-di-tert-butylphenyl)pentaerythritol diphosphite and bis(2,6-di-tert-butyl-4-methylphenyl)pentaerythritol diphosphite are preferably used.

These phosphorus-based heat stabilizers described above may be used singly, or two or more of these can be used in combination. The phosphorus-based heat stabilizer is blended in an amount of preferably 0.001 to 1 part by weight based on 100 parts by weight of the resin composition, more preferably 0.01 to 0.5 parts by weight, and still more preferably 0.01 to 0.3 parts by weight.

In the resin composition used in the present invention, for the purpose of suppressing the molecular weight reduction and hue deterioration at the time of extrusion/molding, a hindered phenolic heat stabilizer or a sulfur-based heat stabilizer may be added as heat stabilizers in combination with a phosphorus-based heat stabilizer.

Hindered phenolic heat stabilizers are not particularly limited as long as they have antioxidant functions, and preferable examples thereof include n-octadecyl-3-(4'-hydroxy-3',5'-di-t-butylphenyl)propionate, pentaerythrityl-tetrakis{3-(3,5-di-t-butyl-4-hydroxyphenyl)propionate}, 3,3', 3'',5,5',5'''-hexa-t-butyl-α,α',α''-(mesitylene-2,4,6-triyl)tri-p-cresol and 2,2-thiodiethylenebis{3-(3,5-di-t-butyl-4-hydroxyphenyl)propionate}.

These hindered phenolic heat stabilizers may be used singly, or two or more of these may be used in combination.

The hindered phenolic heat stabilizer is blended in an amount of preferably 0.001 to 1 part by weight based on 100 parts by weight of the resin composition, more preferably 0.01 to 0.5 parts by weight, and still more preferably 0.01 to 0.3 parts by weight.

Examples of the sulfur-based heat stabilizer include dilauryl-3,3'-thiodipropionate, ditridecyl-3,3'-thiodipropionate, dimyristyl-3,3'-thiodipropionate, distearyl-3,3'-thiodipropionate, laurylstearyl-3,3'-thiodipropionate, pentaerythritoltetrakis(3-laurylthiopropionate), bis[2-methyl-4-(3-laurylthiopropionyloxy)-5-tert-butylphenyl]sulfide, octadecyl disulfide, mercaptobenzimidazole, 2-mercapto-6-methyl-benzimidazole and 1,1'-thiobis(2-naphthol). Among them, pentaerythritoltetrakis(3-laurylthiopropionate) is preferable.

These sulfur heat stabilizers may be used singly, or two or more of these may be used in combination.

The sulfur-based heat stabilizer is blended in an amount of preferably 0.001 to 1 part by weight, more preferably 0.01 to 0.5 parts by weight based on 100 parts by weight of the resin composition, and still more preferably 0.01 to 0.3 parts by weight.

When a phosphorus-based heat stabilizer, a hindered phenolic heat stabilizer and a sulfur-based heat stabilizer are used in combination, these stabilizers are blended in a total amount of preferably 0.001 to 1 part by weight based on 100 parts by weight of the resin composition and more preferably 0.01 to 0.3 parts by weight.

(Release Agent)

The resin composition used in the present invention may contain a release agent to such an extent as not to interfere with the object of the present invention, in order to further improve the mold release properties at the time of melt-molding.

Examples of such a release agent include higher fatty acid esters of monohydric or polyhydric alcohols, higher fatty acids, paraffin wax, beeswax, olefin waxes, olefin waxes containing carboxy groups and/or carboxylic anhydride groups, silicone oil and organopolysiloxane, and higher fatty acid esters of monohydric or polyhydric alcohols are preferably used.

As the higher fatty acid esters of monohydric or polyhydric alcohols, partial esters or total esters of a $C_{1-20}$ monohydric or polyhydric alcohol and a saturated $C_{10-30}$ fatty acid are preferable. Examples of such a partial ester or total ester of a monohydric or polyhydric alcohol and a saturated fatty acid include monoglyceride stearate, diglyceride stearate, triglyceride stearate, monosorbitate stearate, stearyl stearate, monoglyceride behenate, behenyl behenate, pentaerythritol monostearate, pentaerythritol tetrastearate, pentaerythritol tetrapelargonate, propyleneglycol monostearate, stearyl stearate, palmityl palmitate, butyl stearate, methyl laurate, isopropyl palmitate, biphenyl biphenate, sorbitan monostearate and 2-ethylhexyl stearate.

Among them, monoglyceride stearate, triglyceride stearate, pentaerythritol tetrastearate and behenyl behenate are preferably used.

As higher fatty acids, saturated $C_{10-30}$ fatty acids are preferable. Examples of such fatty acids include myristic acid, lauric acid, palmitic acid, stearic acid and behenic acid.

These release agents may be used singly, or two or more of these may be used in combination. The amount of such a release agent blended is preferably 0.01 to 5 parts by weight based on 100 parts by weight of the resin composition.

(Ultraviolet Absorber)

The resin composition used in the present invention may contain an ultraviolet absorber. Examples of the ultraviolet absorber include benzotriazole-based ultraviolet absorbers, benzophenone-based ultraviolet absorbers, triazine-based ultraviolet absorbers, cyclic imino ester-based ultraviolet absorbers and cyanoacrylate-based ultraviolet absorbers, and among them, benzotriazole-based ultraviolet absorbers are preferable.

Examples of the benzotriazole-based ultraviolet absorber include benzotriazole-based ultraviolet absorbers as typified by 2-(2'-hydroxy-5'-methylphenyl)benzotriazole, 2-(2'-hydroxy-5'-tert-butylphenyl)benzotriazole, 2-(2'-hydroxy-5'-tert-octylphenyl)benzotriazole, 2-(2'-hydroxy-3',5'-di-tert-butylphenyl)benzotriazole, 2-(2'-hydroxy-3',5'-di-tert-amylphenyl)benzotriazole, 2-(2'-hydroxy-3'-dodecyl-5'-methylphenyl)benzotriazole, 2-(2'-hydroxy-3',5'-bis(α,α'-dimethylbenzyl)phenylbenzotriazole, 2-[2'-hydroxy-3'-(3'',4'',5'',6''-tetraphthalimidomethyl)-5'-methylphenyl] benzotriazole, 2-(2'-hydroxy-3'-tert-butyl-5'-methylphenyl)-5-chlorobenzotriazole, 2-(2'-hydroxy-3',5'-di-tert-butylphenyl)-5-chlorobenzotriazole, 2,2'-methylenebis[4-(1,1,3,3-tetrametylbutyl)-6-(2H-benzotriazol-2-yl)phenol] and methyl-3-[3-tert-butyl-5-(2H-benzotriazol-2-yl)-4-hydroxyphenyl propionate-polyethylene glycol condensates.

The proportion of such an ultraviolet absorber blended is preferably 0.03 to 2.5 parts by weight based on 100 parts by weight of the resin composition, more preferably 0.1 to 2 parts by weight, and still more preferably 0.2 to 1.5 parts by weight.

(Light Stabilizer)

The resin composition used in the present invention may contain a light stabilizer. Inclusion of a light stabilizer brings about excellent weather resistance and also an advantage in that the molded article becomes unlikely to be cracked.

Examples of the light stabilizer include hindered amine, such as 1,2,2,6,6-pentamethyl-4-piperidyl methacrylate, bis(2,2,6,6-tetramethyl-1-octyloxy-4-piperidinyl)didecanoate, bis(1,2,2,6,6-pentamethyl-4-piperidinyl)-[[3,5-bis(1,1-dimethylethyl)-4-hydroxyphenyl]methyl]butylmalonate, 2,4-bis[N-butyl-N-(1-cyclohexyloxy-2,2,6,6-tetramethylpiperidin-2-yl)amino]-6-(2-hydroxyethylamine)-1,3,5-triazine, bis(1,2,2,6,6-pentamethyl-4-piperidinyl)sebacate, methyl(1,2,2,6,6-pentamethyl-4-piperidinyl)sebacate, bis(2,2,6,6-tetramethyl-4-piperidyl)carbonate, bis(2,2,6,6-tetramethyl-4-piperidyl)succinate, bis(2,2,6,6-tetramethyl-4-piperidyl)sebacate, 4-benzoyloxy-2,2,6,6-tetramethylpiperidine, 4-octanoyloxy-2,2,6,6-tetramethylpiperidine, bis(2,2,6,6-tetramethyl-4-piperidyl)diphenylmethane-p,p'-dicarbamate, bis(2,2,6,6-tetramethyl-4-piperidyl)benzene-1,3-disulfonate and bis(2,2,6,6-tetramethyl-4-piperidyl)phenyl phosphite, and nickel complexes, such as nickel bis(octylphenyl) sulfide, nickel complex-3,5-di-t-butyl-4-hydroxybenzyl phosphate monoethylate and nickel dibutyldithiocarbamate. These light stabilizers may be used singly, or two or more of these may be used in combination. The amount of the light stabilizer is preferably 0.001 to 1 part by weight based on 100 parts by weight of the resin composition and more preferably 0.01 to 0.5 parts by weight.

(Epoxy Stabilizer)

To the resin composition used in the present invention, an epoxy compound may be blended to such an extent as not to interfere with the object of the invention of the present application in order to improve the anti-hydrolysis properties.

Examples of the epoxy stabilizer include epoxidized soybean oil, epoxidized linseed oil, phenyl glycidyl ether, allyl glycidyl ether, t-butylphenyl glycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epoxycyclohexyl ethyleneoxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, diglycidyl ester of phthalic acid, diglycidyl ester of hexahydrophthalic acid, bis-epoxydicyclopentadienyl ether, bis-epoxyethylene glycol, bis-epoxycyclohexyl adipate, butadiene diepoxide, tetraphenylethylene epoxide, octyl epoxy tallate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, 3-t-butyl-4,5-epoxytetrahydrophthalic anhydride, diethyl-4,5-epoxy-cis-1,2-cyclohexyl dicarboxylate and di-n-butyl-3-t-butyl-4,5-epoxy-cis-1,2-cyclohexyl dicarboxylate. Bisphenol A diglycidyl ether is preferred in terms of miscibility and the like.

Such an epoxy stabilizer is blended in an amount within a range of preferably 0.0001 to 5 parts by weight based on 100 parts by weight of the resin composition, more preferably 0.001 to 1 part by weight, and still more preferably 0.005 to 0.5 parts by weight.

(Bluing Agent)

To the resin composition used in the present invention, a bluing agent may be blended in order to cancel out a yellow tinge of a lens caused by the polymer or ultraviolet absorber. As bluing agents, those used for polycarbonates may be used without any particular inconvenience. In general, anthraquinone dyes are easily obtained, which is preferable.

Specifically, typical examples of the bluing agent include Solvent Violet 13 (generic name) [CA. No. (Color Index No.) 60725], Solvent Violet 31 (generic name) [CA. No. 68210], Solvent Violet 33 (generic name) [CA. No. 60725], Solvent Blue 94 (generic name) [CA. No. 61500], Solvent Violet 36 (generic name) [CA. No. 68210], Solvent Blue 97 (generic name) ["Macrolex Violet RR" manufactured by Bayer] and Solvent Blue 45 (generic name) [CA. No. 61110].

These bluing agents may be used singly, or two or more of these may be used in combination. These bluing agents are preferably blended in a proportion of $0.1 \times 10^{-4}$ to $2 \times 10^{-4}$ parts by weight based on 100 parts by weight of the resin composition.

(Flame Retardant)

To the resin composition used in the present invention, a flame retardant may also be blended. Examples of the flame retardant include halogen flame retardants such as brominated epoxy resins, brominated polystyrenes, brominated polycarbonates, brominated polyacrylates and chlorinated polyethylenes, phosphate flame retardants such as monophosphate compounds and phosphate oligomer compounds, organic phosphorus flame retardants other than phosphate flame retardants, such as phosphinate compounds, phosphonate compounds, phosphonitrile oligomer compounds and phosphonic amide compounds, organometallic salt flame retardants such as alkaline (earth) metal organic sulfonates, metal borate flame retardants and metal stannate flame retardants, as well as silicone flame retardants, ammonium polyphosphate flame retardants and triazine-based flame retardants. In addition, flame-retardant synergists (such as sodium antimonate and antimony trioxide), dripping inhibitors (such as fibril-forming polytetrafluoroethylene) and the like may also be blended separately and used in combination with the flame retardant.

Among the above flame retardants, compounds without containing chlorine or bromine atom reduce the factors considered to be undesirable for incineration disposal and thermal recycling. Such compounds are thus more suitable as flame retardants for use in the molded article of the present invention, which is characterized also by one feature of reducing the environmental impact.

In the case where a flame retardant is blended, the amount is preferably within the range of 0.05 to 50 parts by weight based on 100 parts by weight of the resin composition. When the amount is 0.05 parts by weight or more, sufficient flame retardancy is developed, while when the amount is 50 parts by weight or less, the strength and the heat resistance of the molded article are excellent.

(Elastic Polymer)

In the resin composition used in the present invention, an elastic polymer may be used as an impact modifier. Examples of the elastic polymer include natural rubber and graft copolymers obtained by copolymerizing a rubber component having a glass transition temperature of 10° C. or less with one or two or more monomer(s) selected from aromatic vinyls, vinyl cyanide, acrylic acid esters, methacrylic acid esters and vinyl compounds copolymerizable therewith. More suitable elastic polymers are core-shell type graft copolymers obtained by graft copolymerization of one or two or more shell monomer(s) with a core of a rubber component.

In addition, examples also include block copolymers of such a rubber component and the above monomer. Specific examples of such block copolymers include thermoplastic elastomers such as styrene-ethylene propylene-styrene elastomers (hydrogenated styrene-isoprene-styrene elastomers) and hydrogenated styrene-butadiene-styrene elastomers. Furthermore, various elastic polymers known as other thermoplastic elastomers, such as polyurethane elastomers, polyester elastomers and polyetheramide elastomers also can be used.

As impact modifiers, core-shell type graft copolymers are more suitable. In a core-shell type graft copolymer, the particle diameter of the core as a weight average particle diameter is preferably 0.05 to 0.8 µm, more preferably 0.1 to 0.6 µm, and still more preferably 0.1 to 0.5 µm. When the particle diameter is in the range of 0.05 to 0.8 µm, better impact resistance is accomplished.

The elastic polymer preferably contains 40% or more of a rubber component, and more preferably 60% or more.

Examples of the rubber component include butadiene rubber, butadiene-acrylate composite rubber, acrylate rubber, acrylate-silicone composite rubber, isobutylene-silicone composite rubber, isoprene rubber, styrene-butadiene rubber, chloroprene rubber, ethylene-propylene rubber, nitrile rubber, ethylene-acrylate rubber, silicone rubber, epichlorohydrin rubber, fluororubber and those obtained by hydrogenating unsaturated bonds of such rubbers. Considering the concern about generation of harmful substances at the time of combustion, rubber components without containing halogen atom are preferred in terms of environmental burdens.

The glass transition temperature of the rubber component is preferably −10° C. or less and more preferably −30° C. or less. Examples of particularly preferred rubber components include butadiene rubber, butadiene-acrylate composite rubber, acrylate rubber and acrylate-silicone composite rubber. A composite rubber means a rubber made of two rubber components copolymerized or inseparably entangled with each other and polymerized to form an IPN structure.

Examples of aromatic vinyls in vinyl compounds to be copolymerized with a rubber component include styrene, α-methylstyrene, p-methylstyrene, alkoxystyrene and halogenated styrene, and particularly, styrene is preferred. Examples of the acrylic ester include methyl acrylate, ethyl acrylate, butyl acrylate, cyclohexyl acrylate and octyl acrylate, and examples of the methacrylic acid ester include methyl methacrylate, ethyl methacrylate, butyl methacrylate, cyclohexyl methacrylate and octyl methacrylate. Particularly, methyl methacrylate is preferred. Among them, particularly, a methacrylic acid ester such as methyl methacrylate is preferably contained as an essential component. More specifically, the methacrylic acid ester is contained in an amount of preferably 10% by weight or more based on 100% by weight of the graft component (in the case of a core-shell type polymer, based on 100% by weight of the shell) and more preferably 15% by weight.

The elastic polymer containing a rubber component having a glass transition temperature of 10° C. or less may be produced by any polymerization method such as bulk polymerization, solution polymerization, suspension polymerization or emulsion polymerization, and the copolymerization technique may be single-stage grafting or multi-stage grafting. In addition, the elastic polymer may also be in a form of mixture with a copolymer composed only of the graft component by-produced at the time of production. In addition to a general emulsion polymerization method, examples of the polymerization method also include a soap-free polymerization method using an initiator such as potassium peroxodisulfate, a seed polymerization method and a two-stage swelling polymerization method. In the suspension polymerization method, it is also possible to employ a method in which an aqueous phase and a monomer phase are separately maintained and precisely fed to a continuous dispersing machine, and the particle size is controlled by the rotation speed of the dispersing machine, a method in which, in a continuous production method, a monomer phase is fed into an aqueous liquid having dispersive power through a small-diameter orifice having a diameter of several to several tens of micrometers or a porous filter, thereby controlling the particle size, and the like. In the case of a core-shell type graft polymer, both for the core and shell, the reaction may be completed in one stage or multiple stages.

Such elastic polymers are commercially available and can be obtained easily. Examples of elastic polymers containing butadiene rubber, acrylate rubber, or butadiene-acrylate composite rubber as a main rubber component include Kaneace B series (e.g., B-56) of Kanegafuchi Chemical Industry Co., Ltd., Metablen C series (e.g., C-223A) and W series (e.g., W-450A) of Mitsubishi Rayon Co., Ltd., Paraloid EXL series (e.g., EXL-2602), HIA series (e.g., HIA-15), BTA series (e.g., BTA-III) and KCA series of Kureha Chemical Industry Co., Ltd., Paraloid EXL series and KM series (e.g., KM-336P and KM-357P) of Rohm and Haas Company, and UCL Modifier Resin series (UMG-AXS Resin series of UMG ABS, Ltd.) of Ube Cycon Co., Ltd. Examples of elastic polymers containing an acrylate-silicone composite rubber as a main rubber component include those commercially available from Mitsubishi Rayon Co., Ltd., under a trade name of Metablen S-2001 or SRK-200.

The compositional proportion of the impact modifier is preferably 0.2 to 50 parts by weight based on 100 parts by weight of the resin composition, preferably 1 to 30 parts by weight, and more preferably 1.5 to 20 parts by weight. Such compositional range can impart satisfactory impact resistance to the composition, while suppressing a decrease in rigidity.

(Molded Article)

The resin composition of the present invention is molded and processed by any method such as an injection molding method, a compression molding method, an injection compression molding method, a melt film forming method and a casting method, and can be used as molded articles such as optical lenses, optical disks, optical films, plastic cell substrates, optical cards, liquid crystal panels, head lamp lenses, light guide plates, diffusion plates, protective films, OPC binders, front plates, enclosures, trays, water tanks, lighting covers, signboards and resin windows. Particularly, the resin composition can be used as members requiring high surface hardness, such as front plates, enclosures, trays, water tanks, lighting covers, signboards and resin windows.

(Method for Producing Film)

The resin composition of the present invention is suitably used in film applications. Examples of the method for producing such a film include known methods such as solution casting, melt extrusion, hot press and calendering. As the method for producing a film of the present invention, the melt extrusion method is preferred from the viewpoint of productivity.

In the melt extrusion method, it is preferred to use a T die to extrude the resin and supply the extruded resin onto a cooling roll. The temperature at this point is determined based on the molecular weight, Tg and melt flow rate of the resin composition, and is preferably in the range of 180 to 350° C. and more preferably in the range of 200 to 320° C. When the temperature is lower than 180° C., the viscosity increases, wherein the orientation and stress strain of the polymer are prone to remain. When the temperature is higher than 350° C., problems such as heat deterioration, coloration and a die line from the T die easily occur.

The resin composition used in the present invention has good solubility in organic solvents, and thus, the solution casting method can also be employed. In the case of the solution casting method, methylene chloride, 1,2-dichloroethane, 1,1,2,2-tetrachloroethane, dioxolane, dioxane or the like is suitably used as the solvent. The amount of the residual solvent in the film obtained by the solution casting method is preferably 2% by weight or less and more preferably 1% by weight or less. When the amount of the residual solvent exceeds 2% by weight, the glass transition temperature of the film markedly drops, which is not preferred from the viewpoint of heat resistance.

The thickness of the film is preferably in the range of 30 to 500 μm, more preferably in the range of 40 to 400 μm, and still more preferably in the range of 50 to 200 μm.

(Photoelastic Coefficient)

The resin composition of the present invention is suitably used as films for display applications and decoration applications, and the absolute value of its photoelastic coefficient is preferably $25 \times 10^{-12}$ $Pa^{-1}$ or less, more preferably 20×

$10^{-12}$ Pa$^{-1}$ or less, still more preferably $15 \times 10^{-12}$ Pa$^{-1}$ or less, and particularly preferably $12 \times 10^{-12}$ Pa$^{-1}$ or less. When the absolute value of the photoelastic coefficient is larger than $25 \times 10^{-12}$ Pa$^{-1}$, the birefringence due to stress becomes large, and light absence is easily occurs when the film is used as a retardation film.

(Total Light Transmittance)

The total light transmittance of a film having a thickness of 75 μm formed from the resin composition of the present invention is preferably 80% or more, more preferably 85% or more, still more preferably 88% or more, particularly preferably 90% or more, and most preferably 91% or more. When a total light transmittance is within the above range, visibility is excellent, which is preferable.

(Surface Treatment)

Films formed from the resin composition of the present invention can be subjected to various surface treatments. Surface treatments herein mean treatments to form a new layer on the surface layer of a resin molded article, such as deposition (such as physical vapor deposition and chemical vapor deposition), plating (such as electroplating, electroless plating and hot dipping), painting, coating and printing, and methods commonly used are applicable. Specific examples of the surface treatment include various surface treatments such as hard coating, water-repellent/oil-repellent coating, UV absorbing coating, IR absorbing coating and metallizing (such as vapor deposition). Hard coating is a particularly preferred and required surface treatment.

EXAMPLES

The present invention will be described in detail referring to Examples, while the present invention is not intended to be limited to these. Incidentally, "part" stands for "part by weight" in Examples. The resins used and evaluation methods used in the Example are as follows.

1. Polymer Compositional Ratio (NMR)

Each repeating unit was measured using Proton NMR of JNM-AL400 manufactured by JEOL Ltd., to calculate the polymer compositional ratio (molar ratio).

2. Specific Viscosity

The specific viscosity was determined in a solution prepared by dissolving 0.7 g of a resin in 100 ml of methylene chloride at 20° C. using an Ostwald viscometer.

Specific Viscosity($\eta_{SP}$)=$(t-t_0)/t_0$

[$t_0$ is the flow down time in seconds for methylene chloride, and t is the flow down time in seconds for a sample solution]

3. Glass Transition Temperature (Tg)

The glass transition temperature was measured using 8 mg of a resin using a Thermoanalysis System DSC-2910 manufactured by TA Instruments in compliance with JIS K7121 in a nitrogen atmosphere (nitrogen flow rate: 40 ml/min) at a temperature rise rate of 20° C./min.

4. Pencil Hardness

In accordance with JIS K5600, in a thermostatic chamber at ambient temperature of 23° C., a line was drawn with a pencil maintained at an angle of 45° under a load of 750 g, on the surface of the first layer of a multilayer body sample cut to a size of 80 mm×60 mm and the surface conditions were visually evaluated.

5. Photoelastic Coefficient

A 200-μm thick cast film was obtained by dissolving a pellet of the polycarbonate resin in methylene chloride and evaporating methylene chloride, and a specimen having a length of 50 mm and a width of 10 mm was cut out from the film after drying at 100° C. for 12 hours. The photoelastic coefficient of the specimen was measured using a Spectroellipsometer M-220 manufactured by JASCO Corporation.

6. Total Light Transmittance

The total light transmittance of a 75-μm thick film was measured using a U-4100 Spectrophotometer manufactured by Hitachi, Ltd.

7. Chemical Resistance

A commercially-available sunscreen cream (Mentholatum SKIN AQUA, SPF27 manufactured by ROHTO Pharmaceutical Co., Ltd.) was homogeneously applied on a film surface. After heat treatment at 80° C. for two hours, the appearance of the film surface after wiping with a cloth was visually observed.

◯: The surface can be wiped clean, without influences.

x: The surface is difficult to wipe or whitens.

8. Melt Flow Rate (MFR)

Measurement was conducted in compliance with JIS-K-7210 at 230° C. under a load of 3.8 kg.

[Polycarbonate Resin]

PC1 (Example): Structural unit derived from isosorbide (hereinafter ISS)/structural unit derived from 3,9-bis(2-hydroxy-1,1-dimethylethyl)-2,4,8,10-tetraoxaspiro(5,5)undecane (hereinafter SPG)=70/30 (mol %), specific viscosity 0.399

PC2 (Example): Structural unit derived from IS S/structural unit derived from SPG=90/10 (mol %), specific viscosity 0.359

PC3 (Example): Structural unit derived from ISS/structural unit derived from SPG/structural unit derived from 1,9-nonanediol (hereinafter ND)=75/20/5 (mol %), specific viscosity 0.396

PC4 (Example): Structural unit derived from IS S/structural unit derived from SPG/structural unit derived from 1,4-cyclohexanedimethanol (hereinafter CHDM)=60/20/20 (mol %), specific viscosity 0.341

PC5 (Comparative Example): Structural unit derived from ISS/structural unit derived from SPG/structural unit derived from ND=85/3/12 (mol %), specific viscosity 0.398

PC6 (Comparative Example): Structural unit derived from ISS/structural unit derived from CHDM=70/30 (mol %), specific viscosity 0.397

PC7 (Comparative Example): Structural unit derived from ISS/structural unit derived from CHDM=50/50 (mol %), specific viscosity 0.367

[Acrylic Resin]

PMMA1: Acrypet VH-001 manufactured by Mitsubishi Rayon Co., Ltd.: The MFR value measured at 230° C. and a load of 3.8 kg was 2.0 g/10 min.

PMMA2: Acrypet MF-001 manufactured by Mitsubishi Rayon Co., Ltd.: The MFR value measured at 230° C. and a load of 3.8 kg was 14.0 g/10 min.

Example 1

<Production of Polycarbonate Resin>

Under a nitrogen atmosphere, 351 parts of isosorbide (abbreviated as ISS hereinafter), 313 parts of 3,9-bis(2-hydroxy-1,1-dimethylethyl)-2,4,8,10-tetraoxaspiro(5,5)undecane (abbreviated as SPG hereinafter), 750 parts of diphenyl carbonate (abbreviated as DPC hereinafter), and 0.8×$10^{-2}$ parts of tetramethylammonium hydroxide, and 0.6×$10^{-4}$ parts of barium stearate as catalysts were heated to 200° C. and the mixture was melted. Then, the temperature was raised to 220° C. and the decompression degree was adjusted to 20.0 kPa over 30 minutes. Thereafter, the temperature was raised to 240° C. and the decompression degree was adjusted to 10 kPa over further 30 minutes. The mixture was maintained at that temperature for 10 minutes, and then the decompression degree was adjusted to 133 Pa or less over 1 hour. After completion of the reaction, the mixture was discharged from the bottom of the reaction tank under pressurized nitrogen and cut with a pelletizer, while cooling in a water tank, to give pellets (PC1).

<Production of Resin Composition>

The polycarbonate resin PC1 and the acrylic resin PMMA1: Acrypet VH-001 manufactured by Mitsubishi Rayon Co., Ltd. (a copolymerized acrylic resin of methyl methacrylate and methyl acrylate) were used. After each resin was dried at 80° C. for 12 hours or more, both resins were mixed at a weight ratio of 60:40 and then, the mixture was melt-kneaded in a vent-type twin-screw extruder [KZW15-25MG manufactured by TECHNOVEL CORPORATION] with both the cylinder and the die at 230° C. to obtain blended pellets of the acrylic resin and the polycarbonate resin.

<Production of Film>

Subsequently, the pellets obtained were dried using a hot air circulation dryer at 90° C. for 12 hours. The pellets obtained were formed into a film at 230° C. on a φ 15 mm twin-screw extruder manufactured by TECHNOVEL CORPORATION, equipped with a T-die having a width of 150 mm and a lip width of 500 μm and a film take-up apparatus to obtain a transparent extruded film having a thickness of 75 μm. The film obtained was subjected to various evaluations. The evaluation results are shown in Table 1.

Example 2

The operation was performed in exactly the same manner as in Example 1, except that a film was extruded at a blend weight ratio of PC1:PMMA1=90/10, followed by evaluations in the same manner. The results are shown in Table 1.

Example 3

The operation was performed in exactly the same manner as in Example 1, except that 451 parts of ISS, 104 parts of SPG, and 750 parts of DPC were used as raw material and a film was extruded at a blend weight ratio of PC2:PMMA1=80/20, followed by evaluations in the same manner. The results are shown in Table 1.

Example 4

The operation was performed in exactly the same manner as in Example 1, except that 376 parts of ISS, 209 parts of SPG, 27 parts of ND, and 750 parts of DPC were used as raw material and a film was extruded at a blend weight ratio of PC3:PMMA1=70/30, followed by evaluations in the same manner. The results are shown in Table 1.

Example 5

The operation was performed in exactly the same manner as in Example 1, except that 301 parts of ISS, 209 parts of SPG, 99 parts of CHDM, and 750 parts of DPC were used as raw material and a film was extruded at a blend weight ratio of PC4:PMMA1=70/30, followed by evaluations in the same manner. The results are shown in Table 1.

Example 6

The operation was performed in exactly the same manner as in Example 1, except that 451 parts of ISS, 104 parts of SPG, and 750 parts of DPC were used as raw material and a film was extruded at a blend weight ratio of PC2:PMMA2=70/30, followed by evaluations in the same manner. The results are shown in Table 1.

Example 7

The operation was performed in exactly the same manner as in Example 1, except that a film was extruded at a blend weight ratio of PC1:PMMA1=50/50, followed by evaluations in the same manner. The results are shown in Table 1.

Comparative Example 1

The operation was performed in exactly the same manner as in Example 1, except that a film was extruded at a blend weight ratio of PC1:PMMA1=30/70, followed by evaluations in the same manner. The results are shown in Table 1. In the chemical resistance test, remarkable whitening was observed.

Comparative Example 2

The operation was performed in exactly the same manner as in Example 1, except that 426 parts of ISS, 31 parts of SPG, 66 parts of ND, and 750 parts of DPC were used as raw material and a film was extruded at a blend weight ratio of PC5:PMMA1=70/30, followed by evaluations in the same manner. The results are shown in Table 1. After extrusion, whitened pellets were obtained. Whitening remained also after film extrusion, and transparency could not be maintained.

Comparative Example 3

The operation was performed in exactly the same manner as in Example 1, except that 351 parts of ISS, 148 parts of CHDM, and 750 parts of DPC were used as raw material and a film was extruded at a blend weight ratio of PC6:PMMA1=70/30, followed by evaluations in the same manner. The results are shown in Table 1. After extrusion, whitened pellets were obtained. Whitening remained also after film extrusion, and transparency could not be maintained.

Comparative Example 4

The operation was performed in exactly the same manner as in Example 1, except that 256 parts of ISS, 251 parts of CHDM, and 750 parts of DPC were used as raw material and a film was extruded at a blend weight ratio of PC7:PMMA1=70/30, followed by evaluations in the same manner. The results are shown in Table 1. After extrusion, whitened pellets were obtained. Whitening remained also after film extrusion, and transparency could not be maintained.

TABLE 1

| | | Example 1 | Example 2 | Example 3 | Example 4 | Example 5 | Example 6 | Example 7 | Comparative example 1 | Comparative example 2 | Comparative example 3 | Comparative example 4 |
|---|---|---|---|---|---|---|---|---|---|---|---|---|
| Polycarbonate resin (wt %) | PC1 | 60 | 90 | | | | | | 50 | 30 | | |
| | PC2 | | | 80 | | 70 | | 70 | | | | |
| | PC3 | | | | 70 | | | | | | | |
| | PC4 | | | | 70 | | | | | | | |
| | PC5 | | | | | | | | | | 70 | |
| | PC6 | | | | | | | | | | | 70 |
| | PC7 | | | | | | | | | | | 70 |
| Acrylic resin (wt %) | PMMA1 | 40 | 10 | 20 | 30 | 30 | | 50 | 70 | 30 | 30 | 30 |
| | PMMA2 | | | | | | 30 | | | | | |
| Glass transition temperature (Tg) | ° C. | 119 | 134 | 138 | 115 | 114 | 105 | 114 | 107 | 115/105 | 117/106 | 96/108 |
| Total light transmittance | % | 92 | 92 | 92 | 92 | 92 | 92 | 92 | 92 | Whitened | Whitened | Whitened |
| Pencil hardness | — | 2H | H | H | H | H | H | 2H | 2H | — | — | — |
| Chemical resistance | — | ○ | ○ | ○ | ○ | ○ | ○ | ○ | x | — | — | — |
| Photoelastic coefficient | $10^{-12}$ Pa$^{-1}$ | 7 | 10 | 11 | 9 | 15 | 8 | 5 | 2 | — | — | — |

INDUSTRIAL APPLICABILITY

Films formed from the resin composition of the present invention are useful as films for display applications and decorative applications.

The invention claimed is:

1. A resin composition consisting of:
a polycarbonate resin (A) containing, as main repeating units, a unit (a-1) represented by the following formula (a-1)

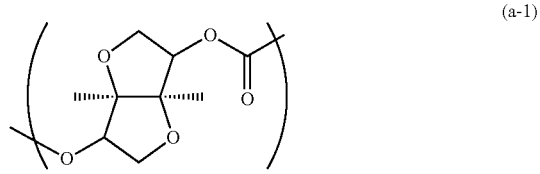

(a-1)

and a unit (a-2) represented by the following formula (a-2)

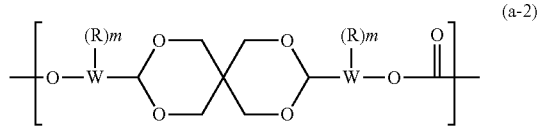

(a-2)

wherein W represents a $C_{1-20}$ alkylene group or a $C_{6-20}$ cycloalkylene group, R represents a branched or linear-chain $C_{1-20}$ alkyl group or a $C_{6-20}$ cycloalkyl group optionally substituted, and m represents an integer of 0 to 10; and
an acrylic resin (B) containing as monomer components, 50 to 99 mol % of methyl methacrylate and 1 to 50 mol % of methyl acrylate,
wherein the polycarbonate resin (A) and the acrylic resin (B) are in a weight ratio of 50:50 to 90:10,
wherein the resin composition has a single glass transition temperature, and the glass transition temperature is in the range of 90° C. to 150° C.,
wherein the polycarbonate resin (A) has a molar ratio (a-1/a-2) of the unit (a-1) to the unit (a-2) of 40/60 to 85/15,
wherein the polycarbonate (A) has a specific viscosity ($\eta_{SP}$) of 0.3 to 1.5,
wherein the resin composition is produced by a step consisting of melt mixing the polycarbonate resin (A) and the acrylic resin (B) in a twin-screw extruder, and
wherein the resin composition has a total light transmittance of 85% or more.

2. The resin composition according to claim 1, wherein the composition has a surface hardness of F or higher.

3. The resin composition according to claim 1, wherein the composition has a photoelastic coefficient of $25 \times 10^{-12}$ Pa$^{-1}$ or less.

4. The resin composition according to claim 1, wherein the acrylic resin is a thermoplastic acrylic resin which complies with JIS K7210 and has a melt flow rate, measured at 230° C. and a load of 3.8 kg, of 0.5 to 30 g/10 min.

5. The resin composition according to claim 1, wherein the unit (a-2) of the polycarbonate resin (A) is a unit derived from 3,9-bis(2-hydroxy-1,1-dimethylethyl)-2,4,8,10-tetraoxaspiro[5.5]undecane.

6. A film formed from the resin composition according to claim 1.

7. A method of producing the resin composition according to claim 1, consisting of melt mixing the polycarbonate resin (A) and the acrylic resin (B) in a twin-screw extruder.

* * * * *